(12) United States Patent
Jung

(10) Patent No.: US 6,311,051 B1
(45) Date of Patent: Oct. 30, 2001

(54) MOBILE COMMUNICATION SYSTEM WITH OFFSET COMPENSATION CIRCUITRY

(75) Inventor: Duck-Young Jung, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/344,711

(22) Filed: Jun. 25, 1999

(30) Foreign Application Priority Data

Jun. 25, 1998 (KR) ................................................ 98-24082

(51) Int. Cl.[7] ........................................................ N04B 1/10
(52) U.S. Cl. .......................... 455/296; 455/303; 455/311; 455/312; 455/313; 375/319
(58) Field of Search ................................... 455/296, 303, 455/311, 312, 313; 375/316, 317, 319, 222

(56) References Cited

U.S. PATENT DOCUMENTS 5,724,653 * 3/1998 Baker et al. ......................... 455/296
6,009,126 * 12/1999 Van Bezooijen ..................... 375/319

* cited by examiner

Primary Examiner—Tracy Legree
Assistant Examiner—Temica M. Davis

(57) ABSTRACT

A mobile communication system comprising an analog baseband processor that is configured for providing improved DC offset compensation. An offset compensation circuit of the analog baseband processor generates a first DC offset compensation signal to preset DC offset voltage of analog baseband signal when the mobile communication system is power on. A mobile station modem of the mobile communication system generates a second DC offset compensation signal to compensate for a detected DC offset voltage during operation of the mobile communication system subsequent to the DC offset voltage being preset. In addition, the offset compensation circuit re-presets the DC offset by generating a third DC offset compensation signal whenever the mobile communication system enters a predetermined mode of operation such as a "data send" mode.

15 Claims, 4 Drawing Sheets

MOBILE COMMUNICATION SYSTEM WITH OFFSET COMPENSATION CIRCUITRY

BACKGROUND

1. Technical Field

The present invention relates generally to a mobile communication system and, more particularly, to a mobile communication system having a baseband analog processor with DC offset compensation circuitry.

2. Description of Related Art

Code division multiple access (CDMA) is based on technology originally developed by the Allies during World War II to resist enemy radio jamming. It has been significantly refined during the intervening decades, and is used today in digital cellular services and personal communication services (PCS), as well as a variety military applications.

The earliest radio transmissions were unintentionally spread across a broad frequency spectrum, much like CDMA. However, the proliferation of uses for radio, coupled with the inherent inability to discern the difference between one radio signal and another, led to change. This change was the division of the radio spectrum into specific bands and frequencies, or channels, to prevent one transmission from interfering with another. This change was made possible by improvements in radio filter technology.

With CDMA technology, the signal is spread over a broad frequency of spectrum. In particular, the CDMA process involves dividing a digitized voice transmission into small packets of encoded data which are then transmitted along with other transmissions across a broad band of spectrum. Each transmission is spread in bandwidth by its own encoding sequence so that no transmission has the same code. Although all transmissions are sent out simultaneously, the unique code allows the receiver to separate one transmission from all the others.

Referring to FIG. 1, a block diagram illustrates a conventional mobile communication system which may be implemented, e.g., in a CDMA mobile phone. The conventional system comprises an input circuit 100, a gain control circuit 200, a baseband analog processor 300, a digital mobile station modem (MSM) 400, and a coder-decoder (CODEC) 500, all of which are serially connected between an antenna 10 and a speaker 20 in the order as illustrated.

The conventional mobile communication system of FIG. 1 operates as follows. A very weak signal RFA received from a base station via the antenna 10 is down-converted into an intermediate frequency (denoted by IFA1) band by the input circuit 100. The IFA1 signal is provided to the gain control circuit 200, wherein it is amplified to produce an IFA2 signal. This IFA2 signal is then received by the baseband analog processor 300, wherein it is down-converted to generate a first baseband analog signal which is then converted to a first baseband digital signal BBD1. The BBD1 signal is input to the MSM 400, wherein it undergoes CDMA demodulation. The CDMA demodulated signal is output as a second baseband digital signal BBD2, which is then processed by the CODEC 500 to extract the voice data. The voice data is then output via the speaker 20.

Referring now to FIG. 2, a detailed block diagram illustrates a conventional baseband analog processor 300 of the system illustrated in FIG. 1. As shown, the conventional baseband analog processor 300 comprises a down converter 310, a low-pass filter 320, an analog-to-digital converter (ADC) 330, and an offset compensation circuit 340. The down converter 310 down-converts the IFA2 signal to the baseband analog signal BBA1. The baseband analog signal BBA1 is then filtered by the low-pass filter 320 to eliminate noise. The low-pass filter 320 is typically a high order low-pass filter. Typically, the filtered baseband analog signal BBA2 contains a DC offset voltage AOV, which is one of the corrupting influences present in the analog signal. The control of the DC offset voltage AOV at the input of the ADC 330 is considerably affected by the receiving signal path and the MSM digital processing.

Accordingly, an offset compensation signal OCAS1 is provided to control the DC offset voltage AOV. In particular, the MSM 400 senses the DC offset of the digital baseband data (BBDI) and produces a pulse density modulated (PDM) signal or a pulse width modulated (PWM) signal as the offset compensation signal OCAS1 to compensate the DC offset voltage AOV. The offset compensation signal OCAS1 is settled between 50% and 100% of an ADC full scale. However, since the baseband analog processor 300 is a monolithic integrated circuit (MIC), the DC offset voltage AOV is typically greater than the full scale of the ADC 330. Thus, the offset voltage AOV may not be fully controlled by the offset compensation signal OCAS1.

A conventional solution to the foregoing problem is the use of the offset compensation circuit 340 to compensate the offset voltage AOV. The offset compensation circuit 340 comprises a comparator 341, a counter 342, a latch 343, and a digital-to-analog converter (DAC) 344. When supplied with power, the baseband analog processor 300 generates a "power on" signal POW, which causes the comparator 341 to generate a detection signal COM by comparing the DC offset voltage (AOV) of the filtered baseband analog signal BBA2 and a reference voltage VREF. The counter 342 counts the detection signal COM in synchronism with a clock signal CLK (which is an internal clock signal of the baseband analog processor 300). The counted compensation signal OCDS2 is latched by the latch 343. The latch 343 then sends the OCDS2 signal to the DAC in response to the detection signal COM. The DAC 344 converts the counted compensation signal OCDS2 into a second offset compensation signal OCAS2, which is then received by the filter 320. In this manner, during the "power on" period of, e.g., the CDMA mobile phone, the offset compensation circuit 340 will generate the second offset compensation signal OCAS2 to preset the DC offset voltage AOV, so that the offset voltage is settled below the full scale of the ADC 330.

After the DC offset voltage AOV is preset as described above, the MSM 400 will generate the offset compensation signal OCAS1 to compensate the DC offset voltage AOV of the filtered baseband analog signal BBA2 when the first baseband digital signal BBDI is received by the MSM 400 from the ADC 330.

One disadvantage associated with the conventional baseband analog processor 300 is that the "power on" preset offset voltage of the baseband analog processor 300 is fixed at a constant value. Therefore, when a sudden variation of ambient environment, such as temperature and/or humidity, is encountered during operation of the system, the DC offset voltage AOV may exceed the compensable range, causing the compensation of the offset voltage AOV to be restricted. This may result in an undesired erroneous voice signal. Accordingly, there is a need in the art for a baseband analog processor which provides improved DC offset compensation to overcome the above described disadvantages.

SUMMARY OF THE INVENTION

The present invention is directed to a mobile communication system having a baseband analog processor with improved DC offset compensation circuitry.

In one aspect of the present invention, a mobile communication system comprises:

a first down-converter for converting a radio frequency (RF) signal into an intermediate frequency (IF) signal;

a baseband analog processor for converting the IF signal into an analog baseband signal and for converting the analog baseband signal into a digital baseband signal; and a modem for demodulating the digital baseband signal;

wherein the baseband analog processor is configured for generating a first DC offset compensation signal to preset a DC offset voltage of the analog baseband signal when the mobile communication system is powered on, and for generating a second DC offset compensation signal to re-preset a DC offset voltage of the analog baseband signal when the mobile communication system enters a predetermined mode of operation, and wherein the modem is configured for generating a third DC offset compensation signal to compensate for a DC offset voltage that is detected by the modem subsequent to preset and re-preset of the DC offset voltage.

In another aspect of the present invention, an analog baseband processor for providing DC offset compensation comprises:

a first converter for converting an intermediate frequency (IF) signal into an analog baseband signal; and a DC offset compensation processor for generating a first DC offset compensation signal to preset a DC offset voltage of the analog baseband signal in response to a first control signal, and for generating a second DC offset compensation signal to re-preset a DC offset voltage of the analog baseband signal in response to a second control signal, wherein the second DC offset compensation signal is generated from the first DC offset compensation signal and a third DC offset compensation signal, the third DC offset compensation signal being generated externally to the analog baseband processor and used for compensating the DC offset voltage of the analog baseband signal subsequent to preset and re-preset of the DC offset voltage.

In yet another aspect of the present invention, a method for providing DC offset compensation in a mobile communication system comprises the steps of:

generating an analog baseband signal;

generating a first DC offset compensation signal to preset a DC offset voltage of the analog baseband signal in response to a first control signal;

generating a second DC offset compensation signal to compensate a detected DC offset voltage of the analog baseband signal after preset of the DC offset voltage; and generating a third DC offset compensation signal to re-preset a DC offset of the analog baseband signal in response to a second control signal.

These and other aspects, features and advantages of the present invention will be described and become apparent from the following detailed description of preferred embodiments, which is to be read in connection with the accompanying drawings.

DESCRIPTION OF PREFERRED EMBODIMENTS

Figure 1:
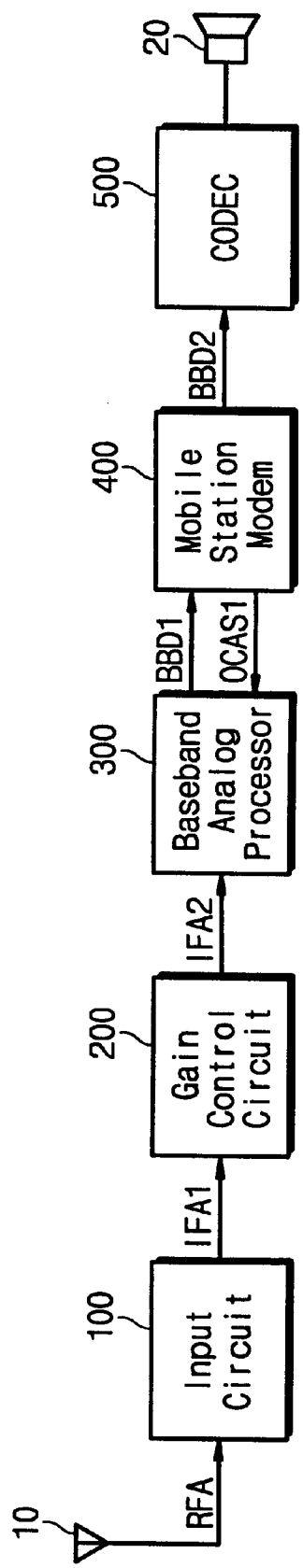
FIG. 1 is a block diagram of a conventional mobile communication system.
Figure 2:
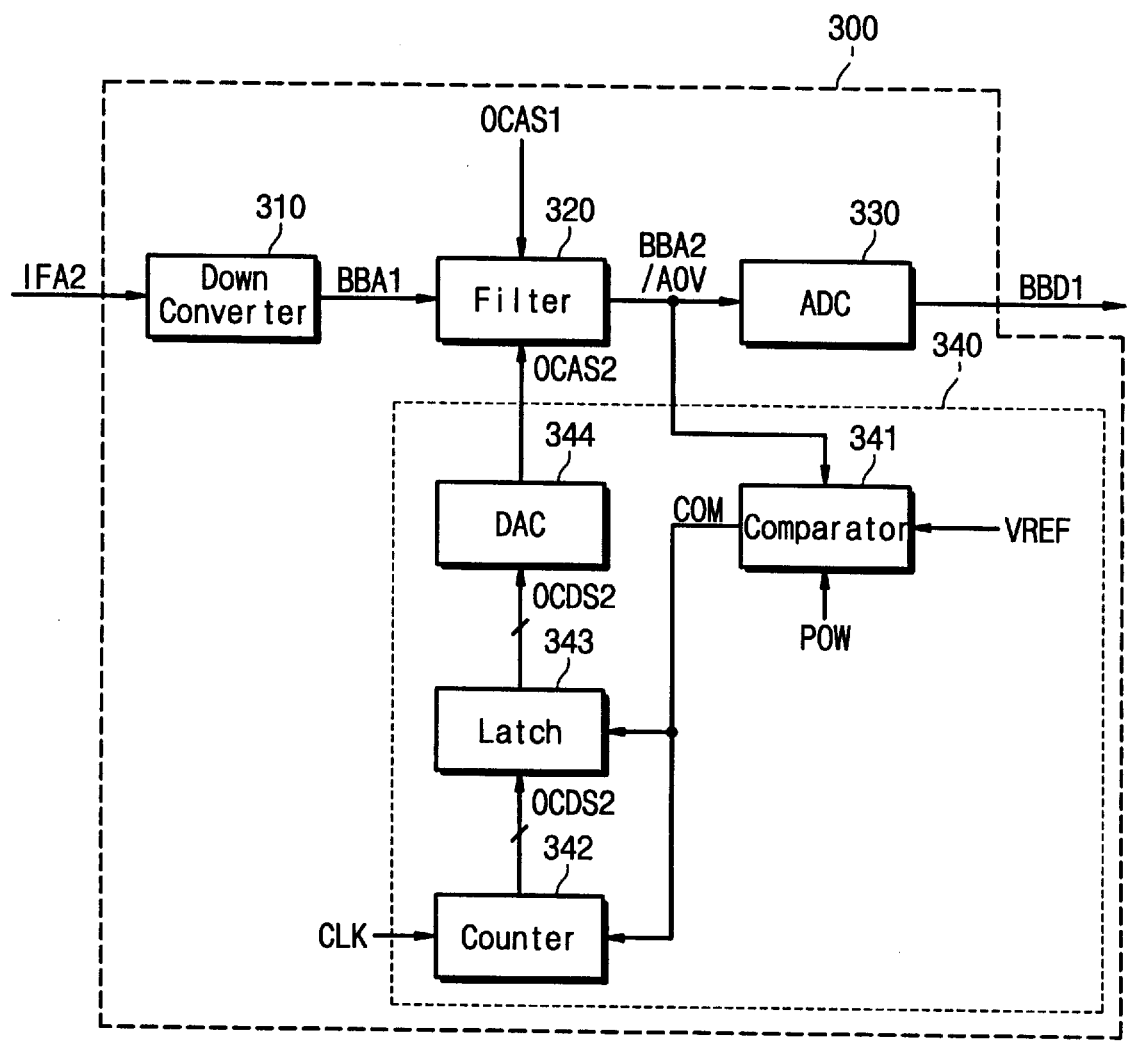
FIG. 2 is a detailed block diagram of a conventional baseband analog processor which may be employed in the conventional system of FIG. 1.
Figure 3:
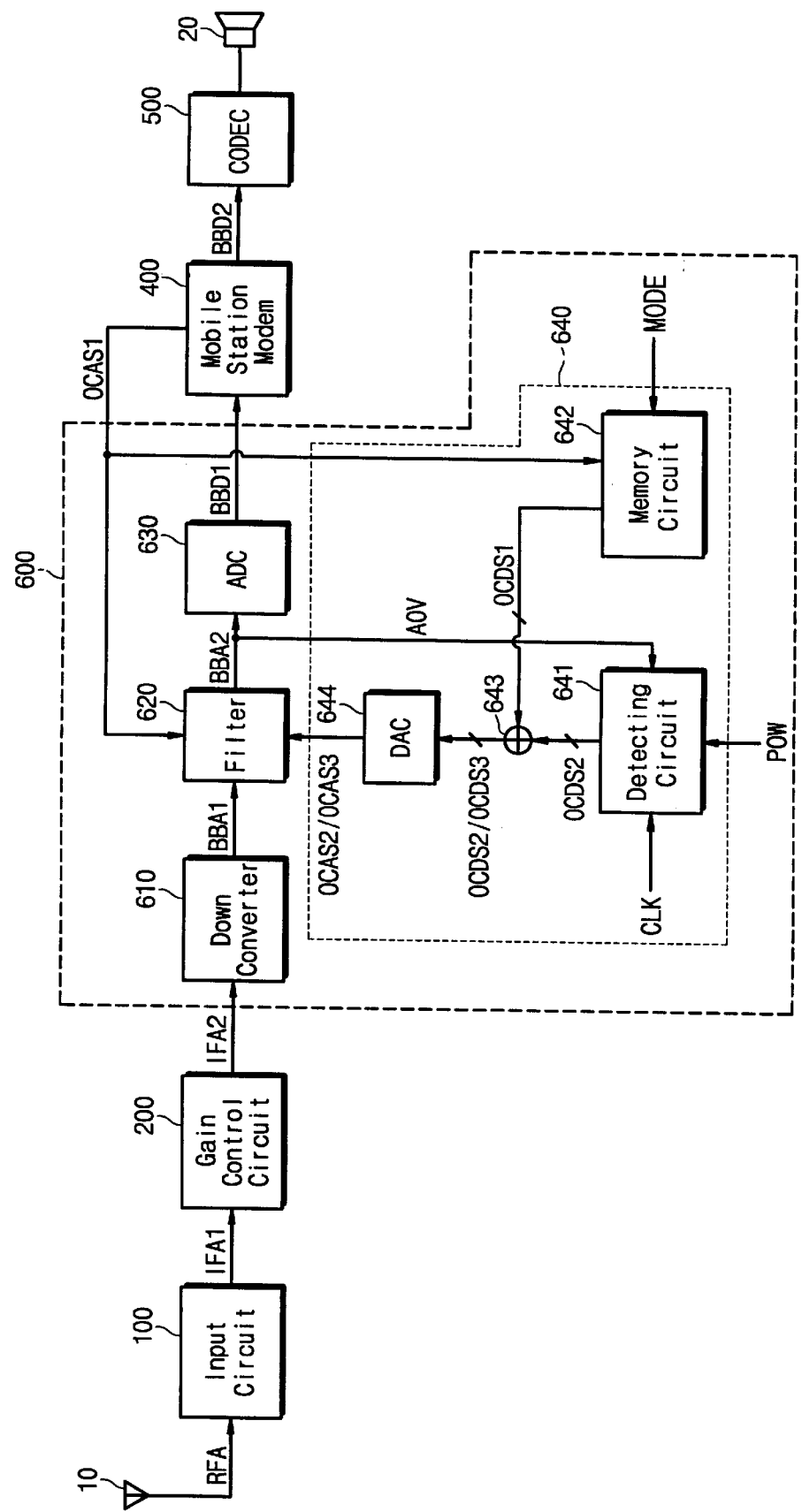
FIG. 3 is a block diagram of a mobile communication system according to an embodiment of the present invention.

Referring now to FIG. 3, a block diagram illustrates a mobile communication system according to an embodiment of the present invention. It is to be understood that system depicted in FIG. 3 will be described as it relates to a CDMA mobile phone, although one skilled in the art can envision other implementations of such system. The mobile communication system comprises an input circuit 100, a gain control circuit 200, a baseband analog processor 600, a digital mobile station modem (MSM) 400, and a coder-decoder (CODEC) 500, which are serially connected between an antenna 10 and a speaker 20 in the order as illustrated. The baseband analog processor 600 comprises a down converter 610, a filter 620, an analog-to-digital converter (ADC) 630, and an offset compensation circuit 640. The offset compensation circuit 640 comprises a detecting circuit 641, a memory circuit 642, an adder circuit 643, and a digital-to-analog converter (DAC) 644. The system illustrated in FIG. 3 generally operates as follows.

A radio frequency signal (denoted as RFA) received from a base station via the antenna 10 is down-converted into an intermediate frequency band (denoted as IFA1) by the input circuit 100. The IFA1 signal is then received and amplified by the gain control circuit 200 to generate an amplified intermediate frequency band signal IFA2. The IFA2 signal is then received by the analog baseband processor 600, wherein it is further down-converted by the down converter 610 to a baseband analog signal BBA1. The BBA1 signal is then passed through filter 620 (which is preferably a high order low-pass filter) to eliminate noise components of the BBA1 signal and generate a filtered baseband analog signal BBA2. The ADC 630 converts the filtered baseband analog signal BBA2 to a baseband digital signal BBD1. The BBD1 signal is then received by the MSM 400, wherein it undergoes, e.g., CDMA demodulation. The CDMA-demodulated signal is then output as a second baseband digital signal BBD2 which is processed by the CODEC 500, and the processed signal is output via the speaker 20.

The filtered baseband analog signal BBA2 contains a DC offset voltage AOV. To compensate the DC offset voltage AOV in accordance with the present invention, the mobile communication system of FIG. 3 produces various offset compensation signals at certain periods of operation. In particular, initially, the offset compensation circuit 640 generates a first offset compensation signal (denoted as OCAS2) to preset the DC offset voltage of the analog baseband signal at a predetermined value when the system (e.g., mobile phone) is powered on. In addition, after the DC offset voltage is preset, the MSM 400 generates a second offset compensation signal (denoted as OCAS1) which is sent to the filter 620 to compensate the DC offset voltage during normal operation of the mobile phone (which, as explained in detail below, is subsequent to preset and each re-preset of the DC offset voltage). In addition, the offset compensation circuit 640 re-presets the DC offset voltage by generating a third offset compensation signal (denoted as OCAS3) whenever the mobile phone enters a predetermined mode of operation (e.g., a "data send" mode). Each of the offset compensation signals will be discussed in further detail below with reference to FIG. 4.

Figure 4:
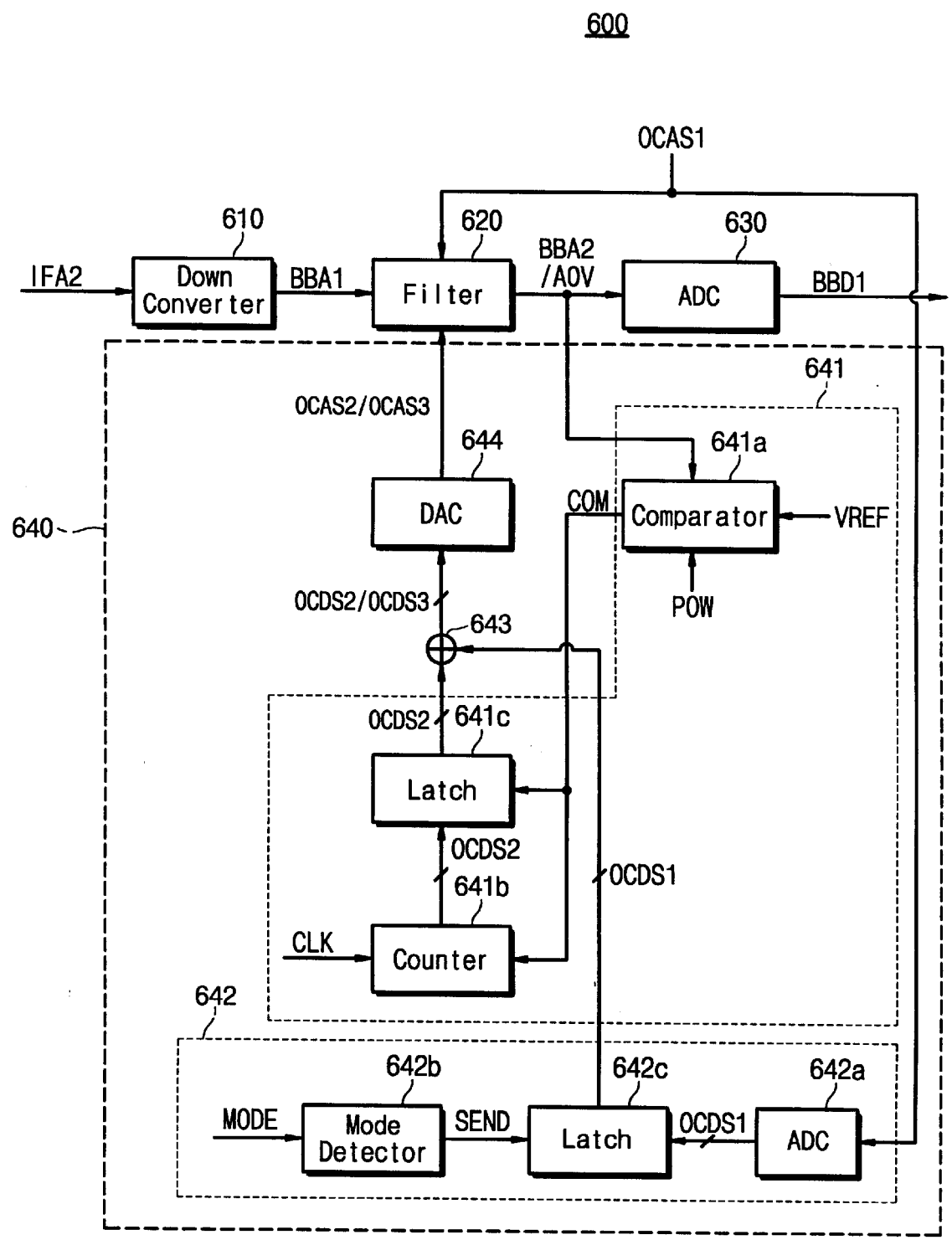
FIG. 4 is a detailed block diagram of a baseband analog processor in accordance with an embodiment of the present invention, which may be implemented in the system illustrated in FIG. 3.

A detailed description of the baseband analog processor 600 according to a preferred embodiment of the present invention will now be described with reference to the detailed block diagram depicted in FIG. 4. As shown, the preferred offset compensation circuit 640 comprises a detecting circuit 641, a memory circuit 642, an adder 643, and a digital-to-analog converter (DAC) 644. The detecting circuit 641 comprises a comparator 641a, a counter 641b, and a latch 641c. When the mobile phone is powered on, the comparator 641 a, in response to a power on signal POW, generates a detection signal COM by comparing the DC offset voltage AOV with a reference voltage VREF. The detection signal COM is a logic high signal corresponding to the DC offset voltage AOV. The counter 641b generates the compensation signal OCDS2 by counting the detection signal COM in response to an internal clock CLK. The latch 641c stores the compensation signal OCDS2, and then sends the OCDS2 signal to the DAC 644. The DAC 644 converts the compensation signal OCDS2 into the offset compensation signal OCAS2, which is then sent to the filter 620 for presetting the DC offset. After the DC offset is preset via the offset compensation signal OCAS2, the offset compensation signal OCAS2 is maintained constantly until such time as the DC offset is re-preset (as discussed in further detail below).

When the presetting process is finished, the baseband analog signal BBA1 (which corresponds to an information signal received from the base station via the antenna 10) is input to the filter 620. The filter 620 outputs the filtered baseband analog signal BBA2. The DC offset voltage AOV contained within the signal BBA2 is settled in compensable range by the presetting process. The ADC 630 converts the filtered baseband analog signal BBA2 to the baseband digital signal BBD1 which (as explained with reference to FIG. 3) is received by the MSM 400. The MSM 400 then generates the offset compensation signal OCAS1 to compensate the DC offset voltage AOV. When the DC offset voltage AOV is determined to be 0V, the offset compensation signal OCAS1 is maintained constantly.

The memory circuit 642 of the offset compensation circuit 640 comprises an ADC 642a, a mode detector 642b, and a latch 642c. The ADC 642a receives the offset compensation signal OCAS1 from the MSM 400, and converts it to the compensation signal OCDS1. The compensation signal OCDS1 is stored in the latch 642c. The mode detector 642b detects operating modes of the system through a mode detection signal MODE received from the MSM 400. The mobile phone may have several operating modes, for example, a "power-up" mode for supplying the power, a "data send" mode for transmitting voice data, and a "sleep" mode for power saving. When the "data send" mode is detected, the mode detector 642b generates a control signal SEND which causes the latch 642c to output the stored compensation signal OCDS1 to the adder 643. The adder 643 generates the compensation signal OCDS3 by adding the compensation signal OCDS1 (received from the latch 642c) and the compensation signal OCDS2. The compensation signal OCDS3 is then received by the DAC 644, wherein it is converted to the offset compensation signal OCAS3 and then sent to the filter 620 for re-presetting the DC offset.

Advantageously, notwithstanding that a sudden variation of ambient environment, such as temperature and/or humidity, is encountered which can affect the preset DC offset, the offset voltage AOV can be further compensated by re-presetting the DC offset voltage AOV through the offset compensation signal OCAS3 from the offset compensation circuit 640.

In summary, the preferred offset compensation circuit 640 of the present invention generates a first offset compensation signal to preset the DC offset voltage AOV from the filter 620 when the mobile phone is powered on. Next, the MSM 400 generates a second offset compensation signal which is sent to the filter 620 to compensate the DC offset voltage AOV during operation of the mobile phone. In addition, the offset compensation circuit 640 re-presets the DC offset voltage AOV by generating a third offset compensation signal whenever the mobile phone enters a predetermined mode of operation such as a "data send" mode, thereby improving its offset compensating performance.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A mobile communication system, comprising:
    a first down-converter for converting a radio frequency (RF) signal into an intermediate frequency (IF) signal;
    a baseband analog processor for converting the IF signal into an analog baseband signal and for converting the analog baseband signal into a digital baseband signal; and
    a modem for demodulating the digital baseband signal;
    wherein the baseband analog processor is configured for generating a first DC offset compensation signal to preset a DC offset voltage of the analog baseband signal when the mobile communication system is powered on, and for generating a second DC offset compensation signal to re-preset a DC offset voltage of the analog baseband signal when the mobile communication system enters a predetermined mode of operation, and wherein the modem is configured for generating a third DC offset compensation signal to compensate for a DC offset voltage that is detected by the modem subsequent to preset and re-preset of the DC offset voltage.

2. The system of claim 1, wherein the predetermined mode of operation is a data send mode for transmitting voice data.

3. The system of claim 1, wherein the baseband analog processor comprises:
    a second down-converter for converting the IF signal into the analog baseband signal;
    a filter for filtering the analog baseband signal;
    a DC offset compensation processor for generating the first and second DC offset compensation signals, the first and second DC offset compensation signals being respectively applied to the filter for presetting and re-presetting a DC offset voltage of the filtered analog baseband signal; and
    an analog-to-digital (ADC) converter for converting the filtered analog baseband signal into the digital baseband signal.

4. The system of claim 3, wherein the DC offset compensation processor comprises:
    a detecting circuit for detecting a DC offset voltage of the filtered analog baseband signal and for generating a first compensation signal in response thereto;

a memory circuit for storing the third DC offset compensation signal from the modem as a third compensation signal;

an adder, operatively coupled to the detecting circuit and the memory circuit, for adding the first compensation signal and the third compensation signal to generate a second compensation signal; and a first converter, operatively coupled between the adder and the filter, for converting the first and the second compensation signals to the first and second DC offset compensation signals, respectively.

5. The system of claim 4, wherein the detecting circuit comprises:

a comparator for generating a detection signal by comparing a DC offset voltage of the filtered analog baseband signal with a reference voltage in response to a first control signal generated when the system is powered on;

a counter for generating the first compensation signal by counting the detection signal in response to an internal clock; and a first latch for storing the first compensation signal output from the counter and outputting the first compensation signal to the adder in response to the detection signal.

6. The system of claim 4, wherein the memory circuit comprises:

a second converter for converting the third DC offset compensation signal to the third compensation signal;

a mode detector for detecting a second control signal indicating the predetermined mode of the mobile communication system and for generating a third control signal; and a second latch for storing the third compensation signal output from the second converter and for outputting the third compensation signal to the adder in response to the third control signal.

7. An analog baseband processor for providing DC offset compensation, comprising:

a first converter for converting an intermediate frequency (IF) signal into an analog baseband signal; and a DC offset compensation processor for generating a first DC offset compensation signal to preset a DC offset voltage of the analog baseband signal in response to a first control signal, and for generating a second DC offset compensation signal to re-preset a DC offset voltage of the analog baseband signal in response to a second control signal, wherein the second DC offset compensation signal is generated from the first DC offset compensation signal and a third DC offset compensation signal, the third DC offset compensation signal being generated externally to the analog baseband processor and used for compensating the DC offset voltage of the analog baseband signal subsequent to preset and re-preset of the DC offset voltage.

8. The analog baseband processor of claim 7, wherein the first control signal is generated in connection with a power on mode.

9. The analog baseband processor of claim 7, wherein the second control signal is generated in connection with a data send mode.

10. The analog baseband processor of claim 7, wherein the DC offset compensation processor comprises:

a filter for filtering the analog baseband signal;

a detecting circuit for detecting a DC offset of the filtered analog baseband signal and for generating a first compensation signal in response thereto;

a memory circuit for storing the externally generated third DC offset compensation signal as a third compensation signal;

an adder, operatively coupled to the detecting circuit and the memory circuit, for adding the first compensation signal and the third compensation signal to generate a second compensation signal in response to the second control signal; and a first converter, operatively coupled between the adder and the filter, for converting the first and the second compensation signals to the first and second DC offset compensation signals, respectively.

11. The analog baseband processor of claim 10, wherein the detecting circuit comprises:

a comparator for generating a detection signal by comparing a DC offset voltage of the filtered analog baseband signal with a reference voltage in response to the first control signal;

a counter for generating the first compensation signal by counting the detection signal in response to an internal clock; and a first latch for storing the first compensation signal output from the counter and for outputting the first compensation signal to the adder in response to the detection signal.

12. The analog baseband processor of claim 10, wherein the memory circuit comprises:

a second converter for converting the third DC offset compensation signal to the third compensation signal;

a mode detector for detecting the second control signal and generating a third control signal; and a second latch for storing the third compensation signal output from the second converter and for outputting the third compensation signal to the adder in response to the third control signal.

13. A method for providing DC offset compensation in a mobile communication system, comprising the steps of:

generating an analog baseband signal;

generating a first DC offset compensation signal to preset a DC offset voltage of the analog baseband signal in response to a first control signal;

generating a second DC offset compensation signal to compensate a detected DC offset voltage of the analog baseband signal after preset of the DC offset voltage; and generating a third DC offset compensation signal to re-preset a DC offset of the analog baseband signal in response to a second control signal.

14. The method of claim 13, further comprising the steps of generating the first control signal in response to a power on mode and generating the second control signal in response to a data send mode.

15. The method of claim 13, wherein the step of generating the third DC offset compensation signal comprises the steps of:

converting the second DC offset compensation signal to a second compensation signal;

storing the second compensation signal;

detecting the second control signal;

adding the stored second compensation signal with a first compensation to generate a third compensation signal, upon detecting the second control signal; and converting the third compensation signal into the third DC offset compensation signal.

* * * * *